United States Patent [19]
Yasui et al.

[11] Patent Number: 5,833,802
[45] Date of Patent: Nov. 10, 1998

[54] APPARATUS FOR PRODUCTION OF A THREE-DIMENSIONAL FABRIC

[75] Inventors: Yoshiharu Yasui; Fujio Hori; Masaaki Amano; Junji Takeuchi, all of Kariya, Japan

[73] Assignee: Kabushiki Kaisha Toyoda Jidohokki Seisakusho, Kariya, Japan

[21] Appl. No.: 889,618

[22] Filed: Jul. 8, 1997

Related U.S. Application Data

[62] Division of Ser. No. 596,593, Feb. 5, 1996.

[30] Foreign Application Priority Data

Feb. 8, 1995 [JP] Japan ................................ 7-020678

[51] Int. Cl.⁶ .......................... D03D 11/00; D03D 41/00
[52] U.S. Cl. .............................. 156/510; 28/149; 139/11; 139/DIG. 1
[58] Field of Search ................. 156/93, 510; 139/11, 139/430, DIG. 1; 28/149

[56] References Cited

U.S. PATENT DOCUMENTS

| 4,881,381 | 11/1989 | Townsend | 28/149 |
|---|---|---|---|
| 5,121,530 | 6/1992 | Sakatani et al. | 28/149 |
| 5,126,190 | 6/1992 | Sakatani et al. | 428/225 |
| 5,211,967 | 5/1993 | Yasui et al. | 139/11 |
| 5,327,621 | 7/1994 | Yasui et al. | 139/11 |

FOREIGN PATENT DOCUMENTS

| 0361796 | 9/1989 | European Pat. Off. . |
|---|---|---|
| 0284497 | 4/1990 | European Pat. Off. . |
| 0678604 | 10/1995 | European Pat. Off. . |
| 1292162 | 11/1989 | Japan . |
| 4289241 | 10/1992 | Japan . |
| 4289243 | 10/1992 | Japan . |
| 5272030 | 10/1993 | Japan . |
| 6184906 | 7/1994 | Japan . |
| 8504838 | 11/1985 | WIPO . |

*Primary Examiner*—Daniel Stemmer
*Attorney, Agent, or Firm*—Brooks Haidt Haffner & Delahunty

[57] ABSTRACT

An apparatus for production of a three-dimensional fabric including laminated fiber layers having a fiber arranged along axial lines and a connection yarn inserted into the fiber layers to connect the fiber layers with each other are described. The fiber layers are formed by arranging the fiber while folding the fiber back along the axial lines. The laminated fiber layers are formed by arranging the fiber along axial lines, by engaging the fiber to a plurality of restriction members located with a predetermined pitch on a frame so as to surround an area where the connection fiber is inserted into the fiber layers, and then folding the fiber back along the axial lines. A plurality of yarn inserting needles arranged in a series together with the connection fiber are simultaneously thrust into the fiber layers until a holding section of each yarn inserting needle projects outside of the fiber layers to make a loop of the connection yarn at each holding section. A lock yarn is inserted into each loop along a direction where the yarn inserting needles are arranged. The lock yarn is tightened by pulling back the yarn inserting needles while pressing members press the fiber layers from opposing sides of the fiber layers near the yarn inserting needles after the lock yarn is inserted into each loop. The fiber layers are removed from the frame after the inserting of the connection yarn is terminated.

7 Claims, 12 Drawing Sheets

APPARATUS FOR PRODUCTION OF A THREE-DIMENSIONAL FABRIC

This application is a division of application Ser. No. 08/596,593, filed Feb. 5, 1996.

BACKGROUND OF THE INVENTION

1. Field of the Invention

The present invention relates generally to a apparatus for production of three-dimensional fabrics. More particularly, it pertains to a method and an apparatus in which a number of fiber layers, each formed by arranging a line of fiber between a plurality of restriction members such as pins form a lamination. The layers of the lamination are then connected by yarns, which are perpendicular to the lamination.

2. Description of the Related Art

Fabric reinforcing composites are commonly used as light structural materials. A reinforcing matrix for such a composite includes three-dimensional fabrics. Composites, having such a three-dimensional fabric as a frame member, are expected to be widely used as a structural material for rockets, aircraft, automobiles, marine vessels, and buildings. A three-dimensional fabric generally consists of three kinds of fibers with each kind of fiber extending along a direction perpendicular to the other kinds of fiber, that is along the X, Y, and Z axial directions. A three-dimensional fabric having five axes, in which bias fibers are angularly arranged with respect to the longitudinal direction in addition to the fibers extended in the X, Y, and Z axial directions, has also been proposed.

As one of the methods for producing the three-dimensional fabric, a line of fiber is repeatedly looped back to first form a fiber layer. A plurality of layers form a lamination. The fiber layers of the lamination are bonded by a yarn arranged in the thickness direction of the lamination. For example, in a method disclosed in Japanese Unexamined Patent Publication 1-292162, a plurality of pipes that guide fibers are provided on a base plate with a predetermined space between one another. A line of fiber is repeatedly looped back between each guide pipe lengthwise to form a fiber layer. Another fiber layer is formed by a line of fiber repeatedly looped back widthwise. Still another layer is formed by a line of fiber repeatedly looped back in an angular direction. By repetitively forming the layers in this order, a lamination having a predetermined number of fiber layers is produced. A hooking device is then inserted into each guide pipe to pull off the pipe. A connection yarn provided underneath the fiber lamination is brought to a position above the lamination by the hooking device to insert a lock yarn into loops formed in the connection yarn. The connection yarn is then lowered to strain the connection yarn and bind the lamination. This procedure is repetitively carried out for each guide pipe to bind the lamination with the connection thread.

A method using a plurality of pins or pipes positioned on a base plate to produce a three-dimensional fabric has also been proposed (e.g., see Japanese Unexamined Patent Publication 4-289241 and Japanese Unexamined Patent Publication 4-289243). In this method, a fiber is folded back between the pins to form a fiber layer. Fiber layers folded in at least two directions are laminated. The pins are then exchanged with a connection yarn to bind each layer and produce a three-dimensional fabric. By changing the shape of the base plate, a three-dimensional fabric having different cross-sectional shapes such as an L-shaped or U-shaped cross-section may be formed.

In these methods, the lamination does not come into contact directly with the surface of the base plate. The lamination is formed on a lower pressure plate placed between each pin erected on the base plate to facilitate the exchanging of the pins with the connection yarn. After the lamination is formed, a higher pressure plate is also arranged above the lamination between the pins to exchange the pins with the connection yarn. The lamination is clamped between the upper and lower pressure plates and removed from the base plate together with the pins. A needle, threaded with the connection yarn, thrusts out each pin from the lamination and inserts the yarn into the lamination to exchange the pins with the yarn. In Japanese Unexamined Patent Publication 5-272030, a method in which the pins and the connection yarn is performed one row at a time is disclosed.

Japanese Unexamined Patent Publication 6-184906 discloses a method for producing a fiber structure (three-dimensional fabric) having the ends of two or more plate sections of the fabric positioned adjacent to and angular to one another without using the base plate of which guide pins are erected on the entire arranging plane of the fibers. As shown in FIG. 20, in this method, an L-shaped frame 62 provided with a plurality of removable guide pins 61 having a predetermined pitch between one another is used. A fiber is engaged to and folded back from each guide pin 61 to form a lamination 63 which consists of a predetermined number of fiber layers formed from fibers arranged in different directions. As shown in FIG. 21(a), a pressing mechanism compresses the lamination 63 with pairs of pressing plates 64 provided at the front and rear surfaces of the lamination 63. The width of the pressing plates 64 is slightly more narrow than the space between adjacent guide pins 61. In this compressed state, a single pair of front and rear pressing plates 64 located at a predetermined position is removed. As shown in FIG. 21(b), the lamination 63 is then bound by using a connection yarn z employing the chain stitch method which uses a latch needle 65. The latch needle 65 is attached to a support member 67. A perforating needle 68 is integrally fixed to the support member 67 to pierce holes at positions where the latch needle 65 is to be inserted.

In prior art producing methods, which insert the connection yarn into the erecting position of the pins after locating the pins or guide pipes on the entire arranging plane of the fiber, a three-dimensional fabric with high density is obtained by erecting pins with a pitch of 2 to 3 mm between each other. The number of pins erected on the base plate may range from two thousand to thirty thousand. Thus, a long period of time is necessary to erect the pins on the base plate and insert the connection yarn. As a result, production of the three-dimensional fabric requires much time.

Since the method disclosed in the Japanese Unexamined Patent Publication 5-272030 simultaneously inserts the connection yarns for each pin row, the productivity is improved when compared with the method in which the insertion is carried out on the pins one by one. However, since both ends of the pins retained in the lamination are in a free state, the position of the ends of the pins is unstable. Hence, alignment of the needle, used to insert the connection yarn, with the pin requires much time.

When the pin is exchanged with the connection yarn, the lamination is pressed by the pressure plates to enhance the density of the fibers. However, since the pins occupy a certain volume in the lamination, it is difficult to enhance the Vf value of the three-dimensional fabric. The Vf value refers to the density of the three-dimensional fabric and is defined by the equation of Vf=fiber volume/three-dimensional fabric volume. In addition, during the exchanging of the pins with the connection yarn, the pressure plates clamp the lamination without any pin held in the lamination. Therefore, the fibers constituting each fiber layer may become loose. This degrades the characteristics of the material when a composite is formed from the lamination.

In a method disclosed in Japanese Patent Publication 6-184906, erecting pins on the entire arranging surface of the fiber does not require much effort. However, it is necessary to press the front and rear surfaces of the lamination 63 with a large number of pressing plates 64. Furthermore, the necessity to maintain the lamination 63 in a compressed state when removing pairs of pressing plates 64 at each position for insertion of the connection yarn z to bind the lamination 63 causes this task to be burdensome. As a result, the structure of the pressing mechanism used for this task is complicated since the pressing plates 64 have a width which is more narrow than the space between the guide pins 61 and since the quantity of the pins 61 is large. In addition, a large compressing force is necessary to simultaneously maintain the entire surface of the lamination 63 in a compressed state. This results in the pressing mechanism having a large size.

SUMMARY OF THE INVENTION

Accordingly, it is a primary objective of the present invention to provide an apparatus that produce a three-dimensional fabric. The present invention simplifies preparation for formation of laminated fiber layers and enables production of a three-dimensional fabric having a larger fiber density than known methods and apparatuses. Another objective of the present invention is to provide a method and an apparatus which produce a three-dimensional fabric facilitating the binding of the laminated fiber layers using a connection yarn.

To achieve the foregoing and other objects and in accordance with the purpose of the present invention, a three-dimensional fabric including laminated fiber layers having a fiber arranged along at least two axial lines and a connection yarn inserted into the fiber layers along a direction perpendicular to the fiber layers to connect the fiber layers with each other is produced. The fiber layers are formed by arranging the fiber while folding the fiber back along the axial lines. The laminated fiber layers are formed by arranging the fiber along at least two axial lines, by engaging the fiber with a plurality of restriction members located with a predetermined pitch on a frame so as to surround an area where the connection yarn is inserted into the fiber layers, and then folding the fiber back along the axial lines. A plurality of yarn inserting needles arranged in a series together with the connection yarn are simultaneously thrust into the fiber layers until a holding section of each yarn inserting needle projects outside of the fiber layers to make a loop of the connection yarn at each holding section. A lock yarn is inserted into each loop along a direction where the yarn inserting needles are arranged to prevent each loop from falling out. The yarn is tightened by pulling back the yarn inserting needles while pressing members press the fiber layers from opposing sides of the fiber layers near the yarn inserting needles after the yarn is inserted into each loop. The fiber layers are removed from the frame after the inserting of the connection yarn is terminated by repeating the needle thrusting step, the yarn inserting step, and the yarn tightening step.

The present invention further includes an apparatus for producing a three-dimensional fabric. The apparatus includes a holding device having a frame including a plurality of restriction members located with a predetermined pitch on the frame so as to surround an area where a connection yarn is inserted into fiber layers. The holding device holds the frame together with the fiber layers located on the frame. A movable support table supports the frame and is movable by a predetermined pitch along a direction parallel to the plane of the fiber layers. A first driving means drives the support table. A needle support is equipped with a plurality of yarn inserting needles arranged in a series by a predetermined pitch and each having a needle hole through which the connection yarn is inserted. The needle support is movable along a direction perpendicular to the fiber layers. A second driving means moves the needle support between a standby position where the yarn inserting needles are apart from the fiber layers and an operational position where each yarn inserting needle penetrates the fiber layers so that each needle hole is exposed from the fiber layers to form a loop of the connection yarn. A first pressing member is located at the standby position side of the yarn inserting needles with respect to the fiber layers. The first pressing member is movable along a direction where the yarn inserting needles move near the yarn inserting needles. A first driving device moves the first pressing member between an operational position where the first pressing member presses the fiber layers and a standby position where the first pressing member is apart from the fiber layers. A second pressing member located opposite to the first pressing member with respect to the fiber layers is movable along the direction that the yarn inserting needles move along. A second driving device moves the second pressing member between an operational position where the second pressing member presses the fiber layers and a standby position where the second pressing member is apart from the fiber layers. A needle holds a lock yarn to be inserted into the loop of the connection yarn. The needle is movable between an operational position where the needle penetrates the loop of the connection yarn linking each yarn inserting needle at the operational position and a standby position where the needle is apart from the fiber layers.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 21(a) is a partial schematic perspective view showing pressing plates in an arranged state in the prior art and FIG. 21(b) is a diagrammatic view showing insertion of a z yarn.

DETAILED DESCRIPTION OF THE PREFERRED EMBODIMENTS

Figure 1:
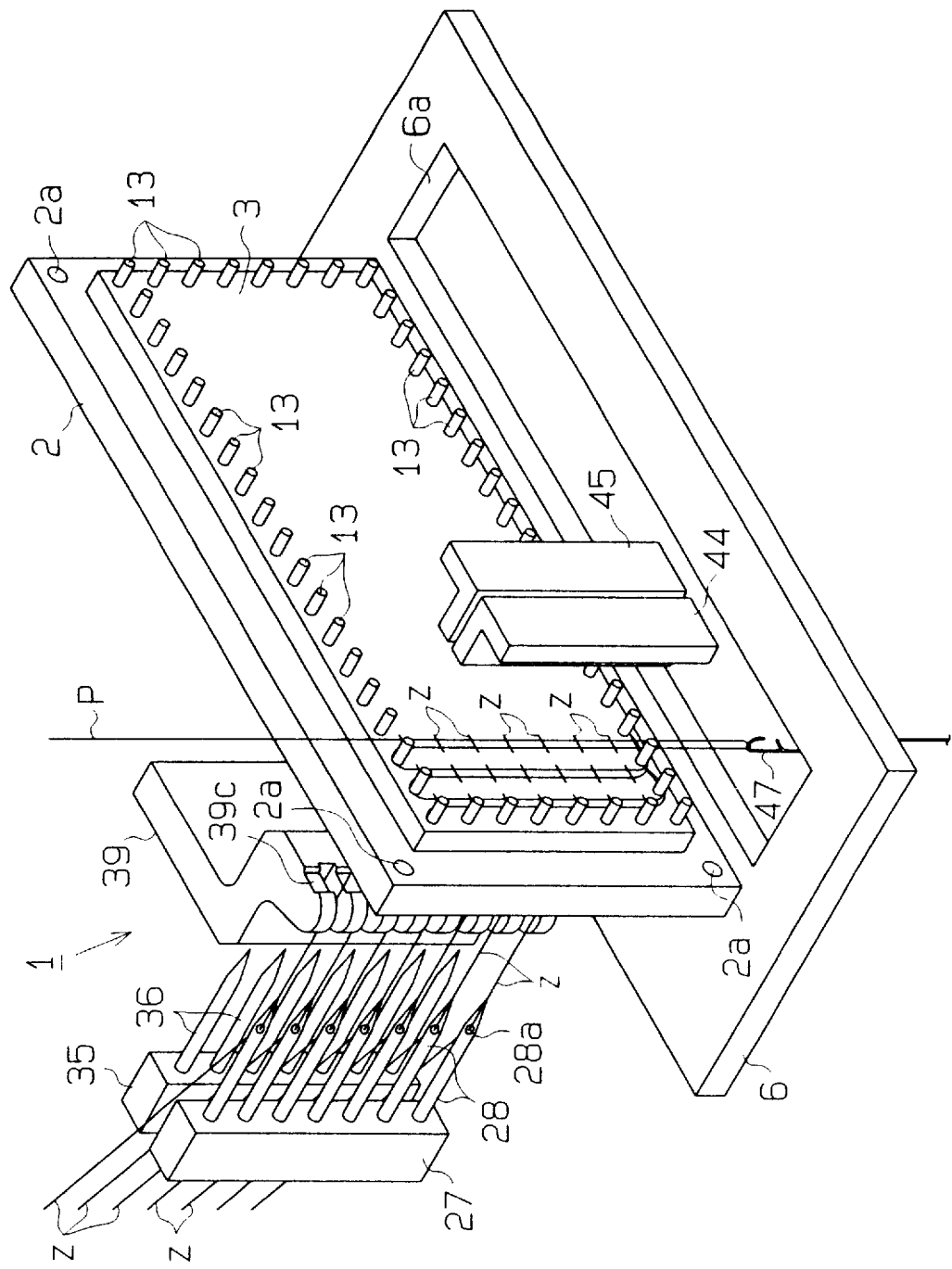
FIG. 1 is a schematic perspective view showing a three-dimensional fabric producing apparatus according to a first embodiment of the present invention.

A first embodiment of the present invention will now be described with reference to FIGS. 1–15. The structure of an apparatus for production of a three-dimensional fabric will first be described. As shown in FIG. 1, a producing apparatus 1 has a frame 2. Laminated fiber layers, or a fiber lamination 3 is arranged on the frame 2 in a substantially vertical manner. The apparatus 1 simultaneously inserts connection yarns z, which extend perpendicular to the lamination 3, into the lamination 3 defined along the width direction (vertical direction of FIG. 1) of the lamination 3.

Figure 2:
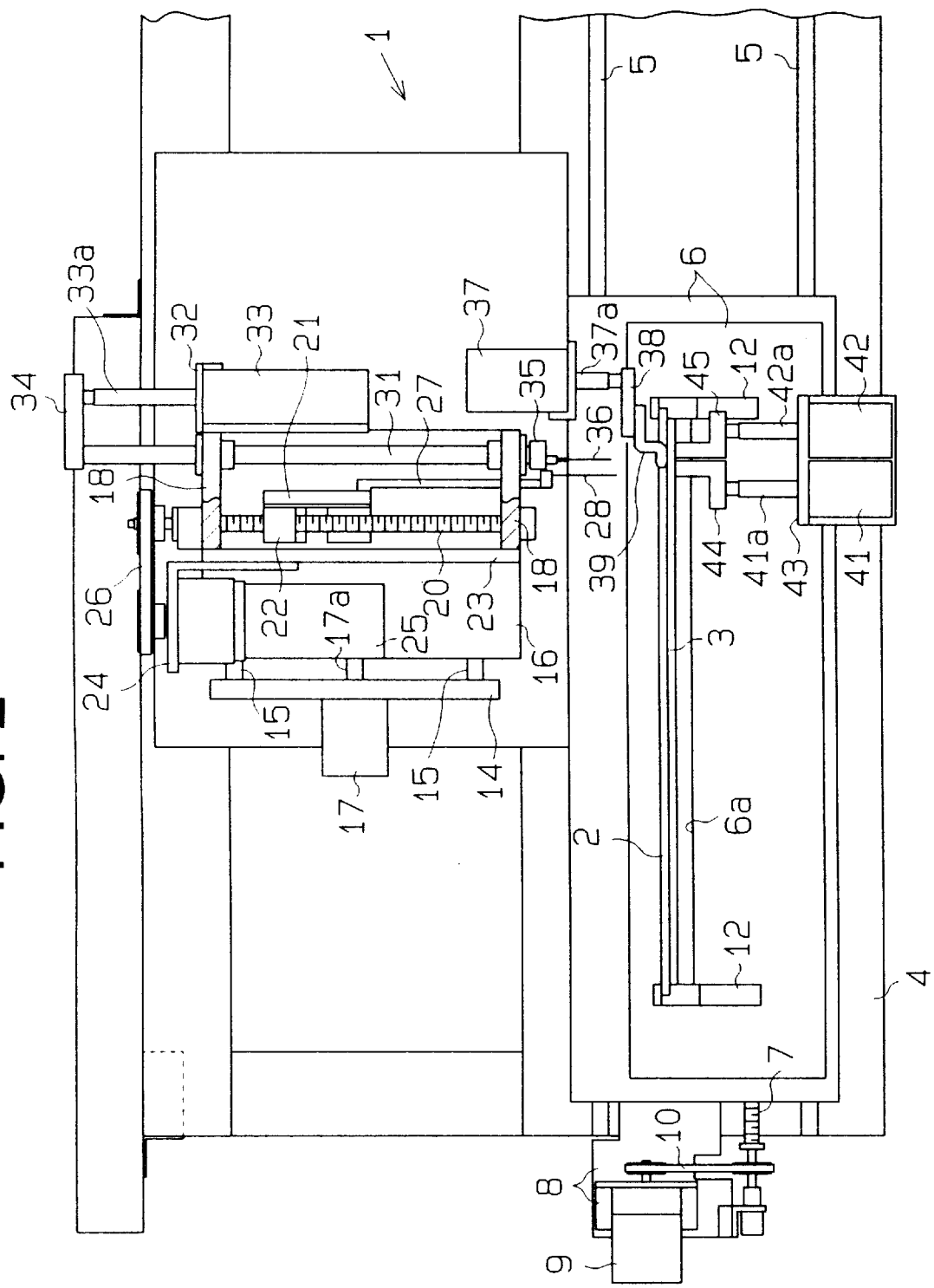
FIG. 2 is a partial schematic top plan view of the apparatus shown in FIG. 1.
Figure 3:
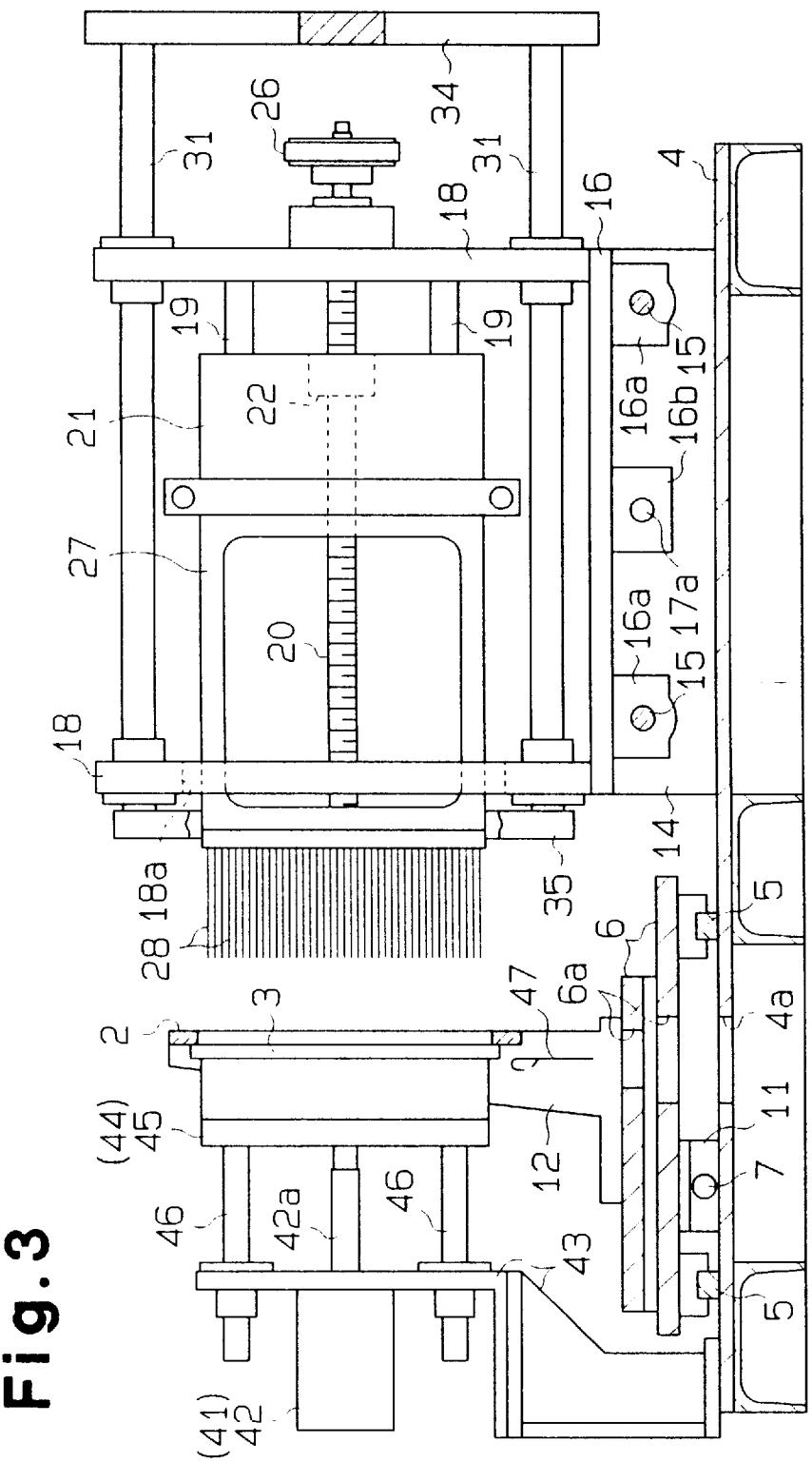
FIG. 3 is a schematic side view of the apparatus shown in FIG. 1.

As shown in FIGS. 2 and 3, a pair of substantially parallel rails 5 extend laterally on a base 4 at the front side (leftward side of FIG. 3) of the apparatus 1. A table 6 is supported to slide along the rails 5. A lead screw 7 extends parallel to the rails 5 under the table 6. A motor 9, which drives the table 6, is fixed to the left end of the base 4 (shown at the left side of FIG. 2) by a bracket 8. The motor 9, rotatable in both forward and reverse directions, rotates the lead screw 7 by way of a belt transmission mechanism 10. A lead screw nut 11, into which the lead screw 7 is threaded, is fixed to the lower surface of the table 6.

A pair of support brackets 12, which constitute a holding device, is provided on the table 6. Threaded holes (not shown) are formed, with a predetermined interval between one another, in the upper and lower rear surfaces of each support bracket 12. Bolt holes 2a (shown in FIGS. 1 and 6) are formed at the corners of the frame 2. By inserting bolts (not shown) into the holes 2a and screwing them into the threaded holes, the frame 2 is fastened to the brackets 12 together with the lamination 3 formed thereon. The motor 9 rotates the lead screw 7 and moves the table 6 together with the frame 2 along the rails 5. The table 6 and frame 2 are moved for a predetermined pitch. The lead screw 7, the motor 9, the belt transmission mechanism 10, and the lead screw nut 11 constitute a first driving means.

As shown in FIGS. 2 and 3, a pair of brackets 14 (only one shown) is provided on the base 4 rearward from the table 6. A pair of guide rods 15, parallel to the rails 5, is provided linking the two brackets 14. A support plate 16 is supported by brackets 16a (shown in FIG. 3) slidably on the guide rods 15. An air cylinder 17 is fixed to one of the brackets 14 with its piston rod 17a connected to the support plate 16 by a bracket 16b. The support plate 16 is moved reciprocally for a predetermined distance when the air cylinder 17 is actuated.

A support bracket 18 is provided at the front and rear end of the support plate 16. A pair of guide rods 19 (shown in FIG. 3 but omitted in FIG. 2) are provided between the brackets 18 at their right sides. The guide rods 19 extend parallel with respect to each other and are aligned vertically with a predetermined space in between. A lead screw 20, which extends through both support brackets 18, is rotatably supported between the two guide rods 19. A moving body 21 is supported by the two guide rods 19. A lead screw nut 22, into which the lead screw 20 is threaded, is fixed to the moving body 21. A support plate 23 is fastened to the left end of the brackets 18. A motor 25 is fixed to the support plate 23 by a bracket 24.

A needle support 27 is secured to the front end of the moving body 21. The needle support 27 is formed having a light-weight rectangular frame-like shape. A plurality of yarn inserting needles 28, each extending horizontally, are aligned in a vertical row at the front side of the needle support 27 to insert the connection yarns z into the lamination 3. A predetermined pitch, which corresponds to the aligning pitch of pins 13 provided on the frame 2, is defined between each needle 28. The needle support 27 extends through an opening 18a (shown in FIG. 3) formed in the front support bracket 18. The motor 25, rotatable in both forward and reverse directions, rotates the lead screw 20 by way of a belt transmission mechanism 26. The motor 25 moves the needle support 27 between a standby position, where the inserting needles 28 are separated from the lamination 3 secured to the support brackets 12 and does not engage with the lamination 3, and an operational position (the state shown in FIGS. 13 and 15(b)), where each needle 28 penetrates the lamination 3 so that its needle hole 28a (shown in FIG. 1 and 15) is exposed from the other side of the lamination 3. The lead screw 20, the lead screw nut 22, the motor 25, and the belt transmission mechanism 26 constitute a second driving means.

As shown in FIGS. 2 and 3, a pair of support rods 31 are connected to the rear end of the front support bracket 18 and extend slidably through the rear bracket 18. An air cylinder 33 extending horizontally toward the front side is secured to the rear side of the support plate 16 by a bracket 32 near the support bracket 18. A coupling plate 34 connects the rear end of both support rods 31 to each other. A piston rod 33a of the air cylinder 33 is connected to the coupling plate 34. A perforating needle support 35 is fixed to the front ends of the two support rods 31. Perforating needles 36 are fixed to the needle support 35 aligned in a row with a predetermined pitch defined between one another, which corresponds to the pitch of the inserting needles 28. The row of the perforating needles 36 is parallel to the row of the inserting needles 28 and the space between the needles 28, 36 is maintained at an equal distance when the air cylinder 17 moves the support plate 16. The air cylinder 33 moves the perforating needle support 35 between a standby position, where the perforating needles 36 are separated from the lamination 3 secured to the support brackets 12 and does not engage with the lamination 3, and an operational position, where the needles 36 penetrate the lamination 3. The air cylinder 33 constitutes a third driving means.

Figure 5A:
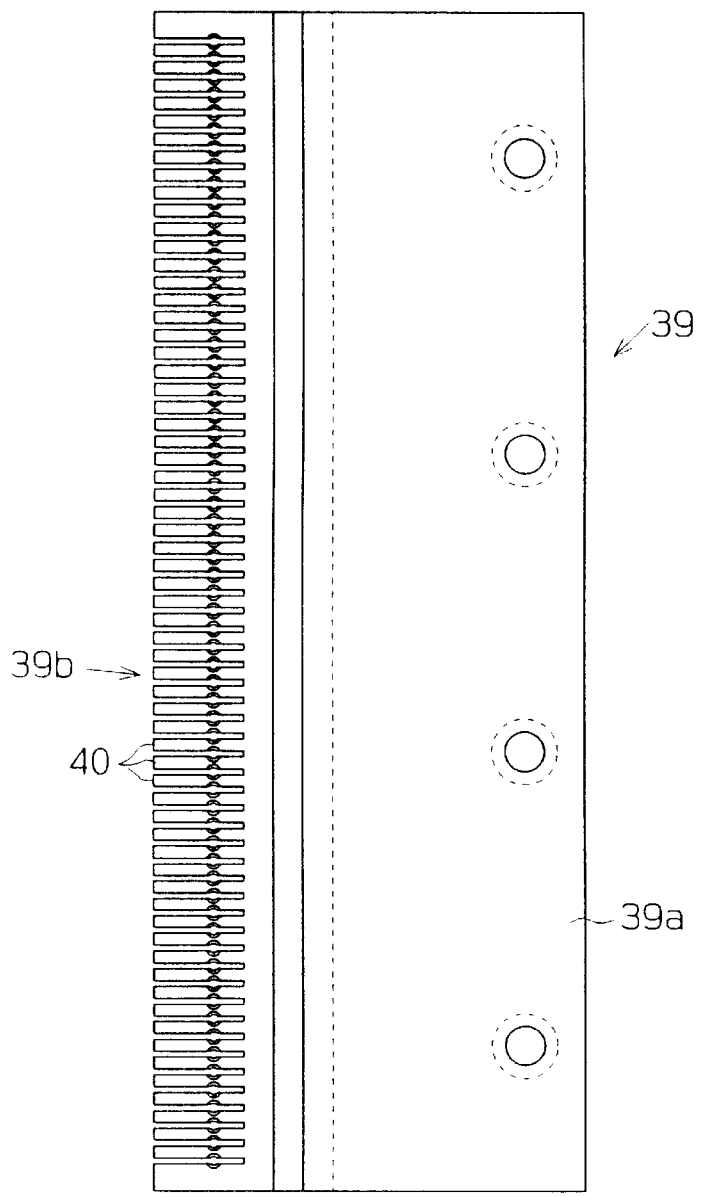
FIG. 5(a) is a plan view showing a press plate.
Figure 5B:
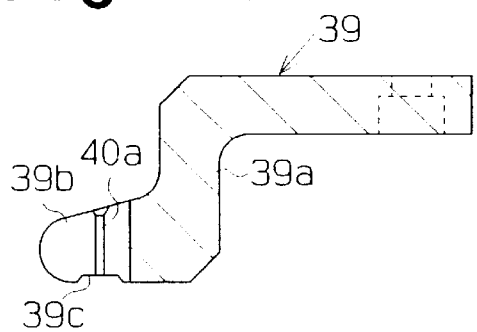
FIG. 5(b) is a cross-sectional view of the press plate.
Figure 5C:
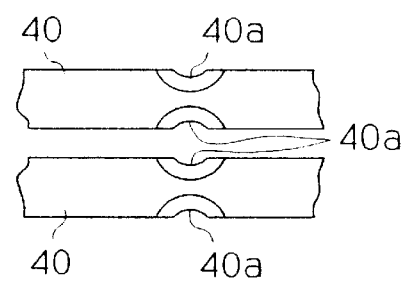
FIG. 5(c) is a partial enlarged plan view showing two adjacent comb teeth.

As shown in FIG. 2, an air cylinder 37 extending horizontally toward the rear side is provided on the base 4 near the front support bracket 18. A press plate 39, serving as a first pressing member, is fixed to the distal end of a piston rod 37a of the air cylinder 37 by a bracket 38. As shown in FIGS. 5(a) and (b), the press plate 39 has a support section 39a, which extends in the direction of the inserting needles 28 and has an L-shaped cross-section and a comb section 39b, which is formed integrally with the support section 39a. Comb teeth 40 are formed at the comb section 39b. As shown in FIG. 5(c), a recess 40a, which guides the inserting needles 28 and the perforating needles 36, is defined on both sides of each tooth 40. Accordingly, this enables the press plate 39 to press the lamination 3 with each inserting needle 28 or perforating needle 36 clamped in the comb section 39b. A recess 39c which faces the lamination 3 is formed in the comb section 39b. The press plate 39 is formed slightly shorter than the inner width of the frame 2. This enables the press plate 39 to press the lamination 3 without interference with the frame 2.

The press plate 39 is provided at the same side of the lamination 3, secured to the support brackets 12, as the inserting needles 28 and the perforating needles 36. The press plate 39 is movable along the moving direction of the inserting needles 28 and is provided near the inserting position of the needles 28. The air cylinder 37 moves the press plate 39 between an operational position, where engagement of the plate 39 with the lamination 3 secured to the support brackets 12 enables pressing of the layers 3 in the inserting direction of the inserting needles 28, and a standby position, where the plate 39 is separated from the layers 3 and does not engage with the layers 3. The air cylinder 37 constitutes a first driving device.

Figure 4:
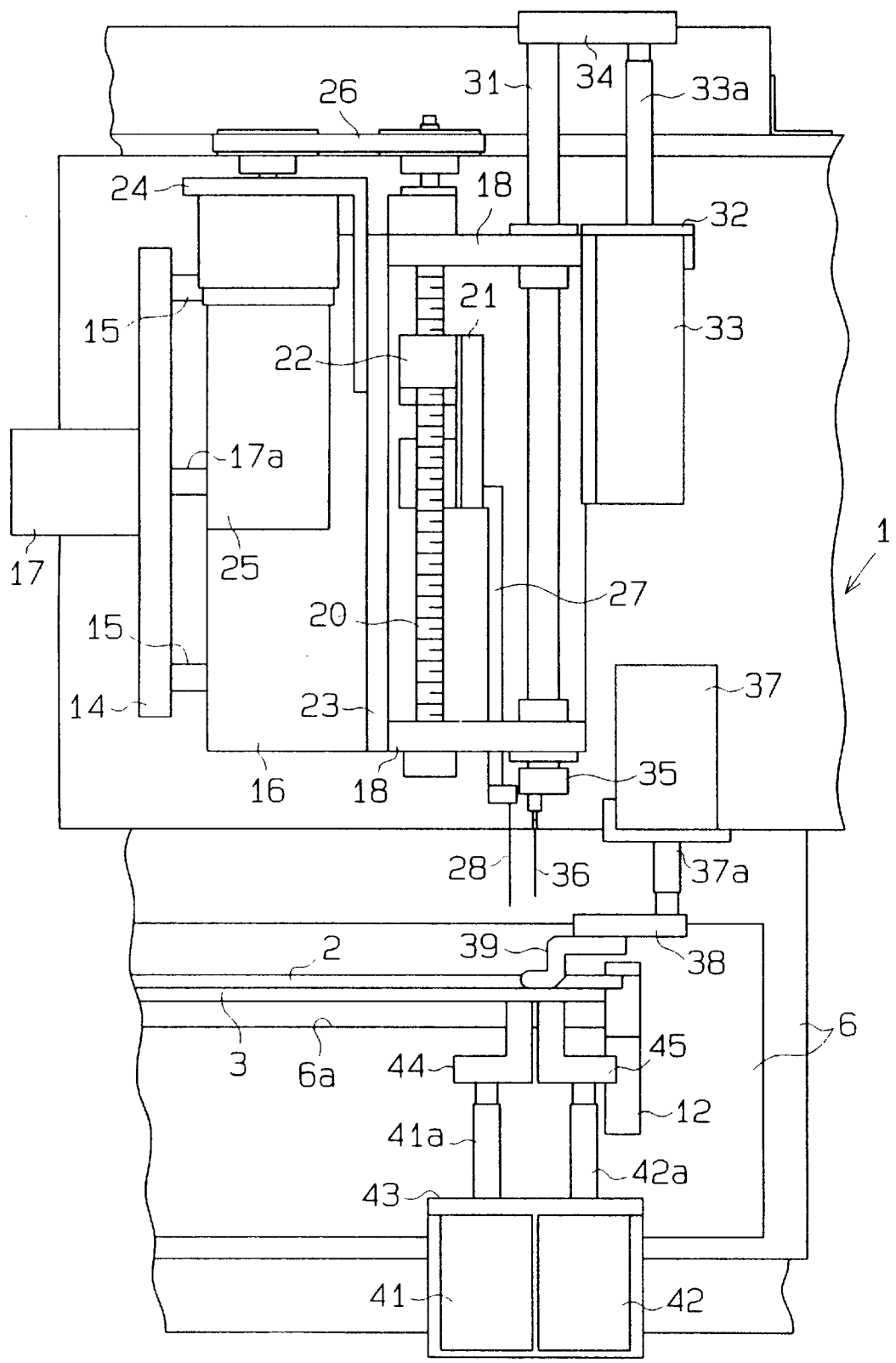
FIG. 4 is an enlarged view of a portion of FIG. 2.

As shown in FIGS. 2 to 4, air cylinders 41 and 42 extend horizontally toward the front side and are fastened to the base 4 by a bracket 43. The cylinders 41, 42 serve as a second driving device. A pair of press blocks 44, 45 are fixed to the distal end of piston rods 41a, 42a of the cylinders 41, 42, respectively. Both press blocks 44, 45 are formed having an L-shaped cross-section and have the same length as the press plate 39. The width of the portion of the blocks 44, 45 where they come into contact with the lamination 3 is wider than the pitch between the pins 13. As shown in FIG. 3, a pair of guide rods 46 extending through the bracket 43 are fixed to each press block 44, 45.

The pair of press blocks 44, 45 is provided opposing the press plate 39. The space defined between the blocks 44, 45 tolerates insertion of the inserting needles 28, which are extended through the recesses 40a, or the perforating needles 36. The air cylinders 41, 42 move the associated press blocks 44, 45 between an operational position, where the blocks 44, 45 press the lamination 3 toward the needles, and a standby position, where the blocks 44, 45 are separated from the layers 3 and do not engage with the layers 3. Both press blocks 44, 45 constitute a second pressing member.

An opening 4a defined in the base 4 and an opening 6a defined in the table 6 are located at a position corresponding to the lower end of the lamination 3 secured to the support brackets 12. A needle 47, which leads a lock yarn P to the lamination 3 to prevent the connection yarns z from falling out, is provided opposite to the openings 4a, 6a. The needle 47 is movable along the row of inserting needles 28 penetrating the lamination 3. The distal end of the needle 47 is shown in FIGS. 1 and 3. The needle 47 has a latch at its distal end and is reciprocally moved by an unillustrated driving device. The needle 47 moves between an operational position, where the needle 47 penetrates a loop formed in each yarn z when the row of inserting needles 28 are at its operational position, and a standby position, where the needle 47 is separated from the lamination 3.

A method for producing a plate shaped three-dimensional fabric using the above apparatus will now be described.

Figure 6:
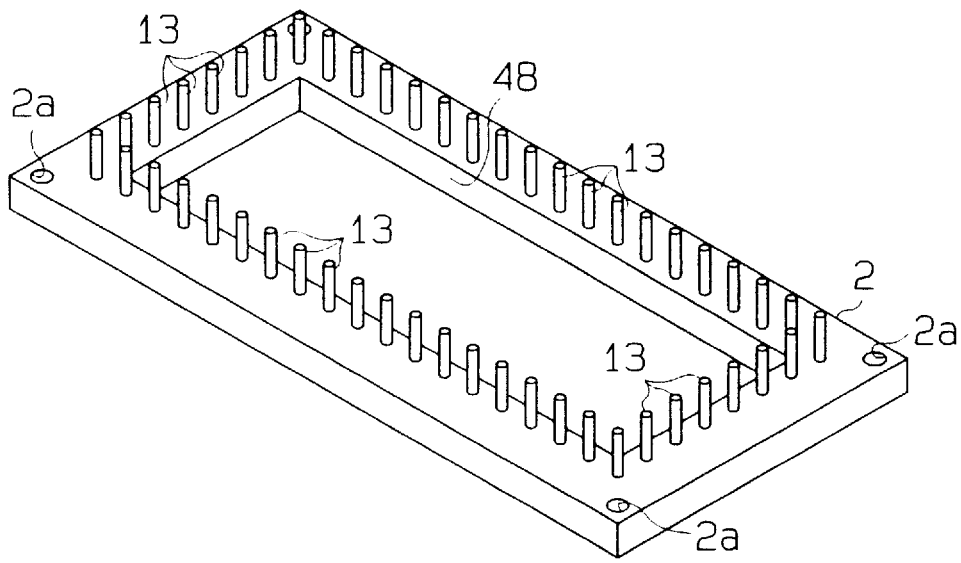
FIG. 6 is a schematic perspective view showing a frame.
Figure 7:
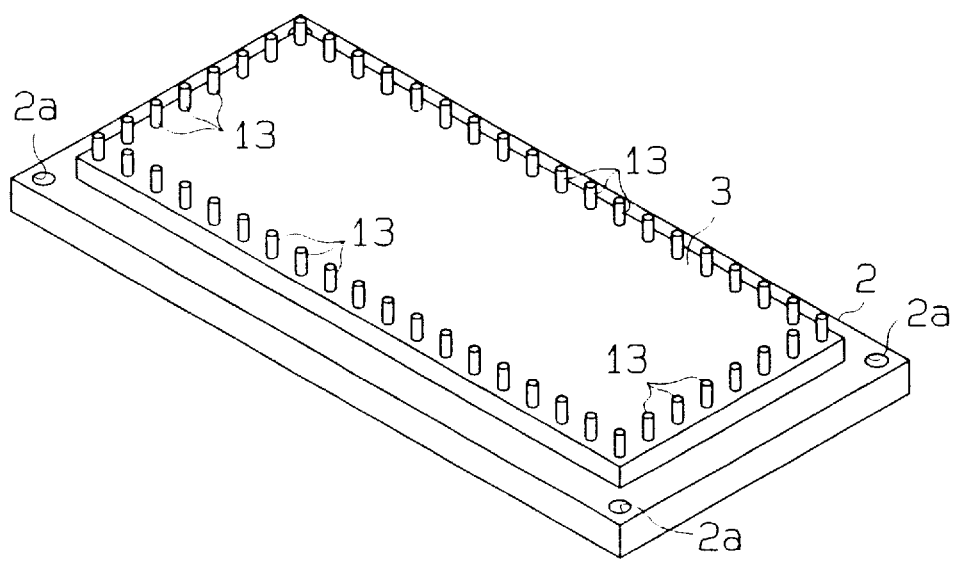
FIG. 7 is a schematic perspective view showing the frame with laminated fiber layers formed thereon.
Figure 8A:
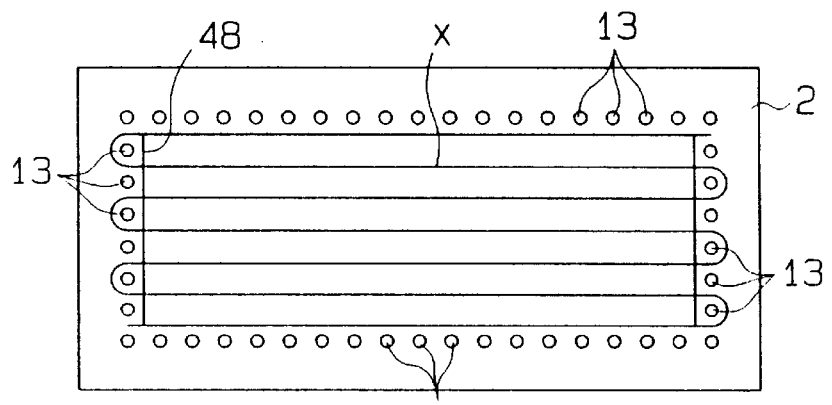
FIGS. 8(a) to 8(d) are diagrammatic views showing arrangements of a fiber.
Figure 8B:
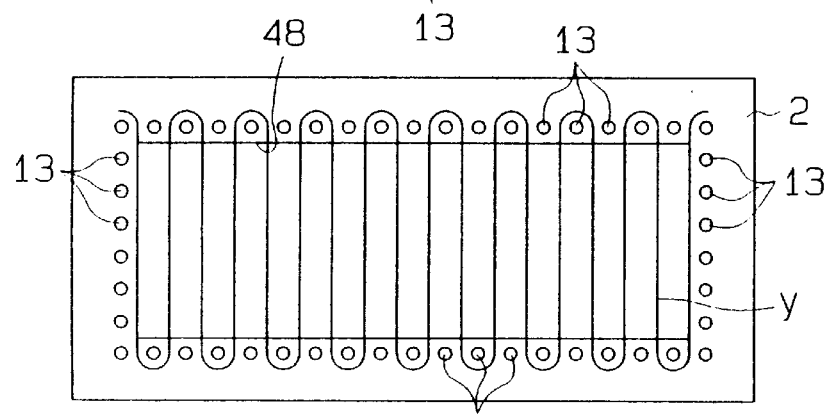
Figure 8C:
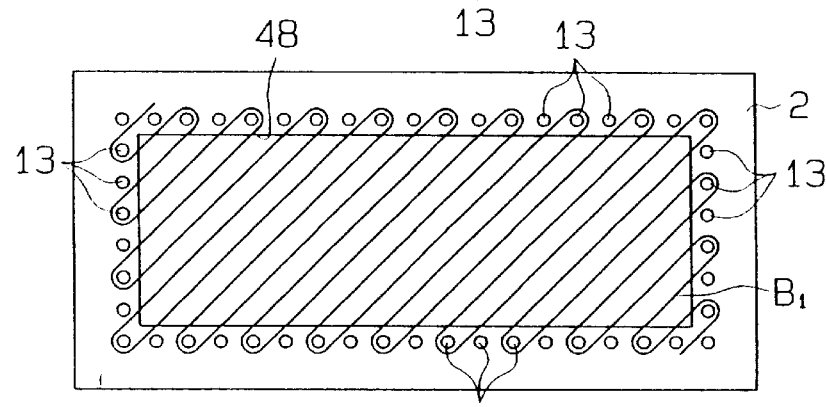
Figure 8D:
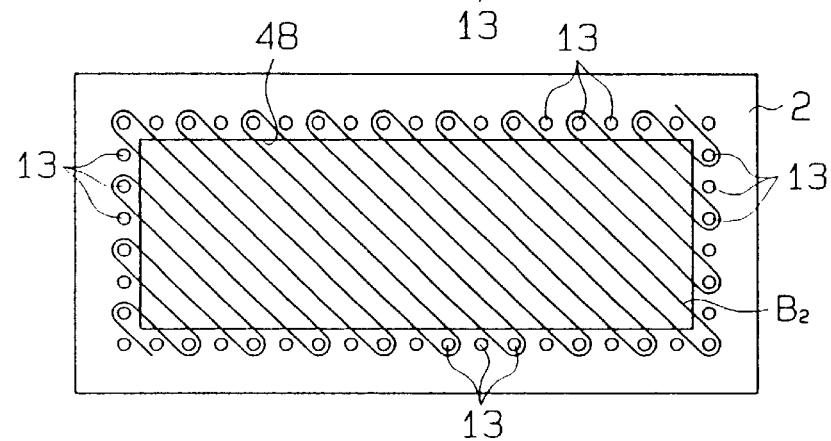

As shown in FIGS. 6 and 8, the lamination 3 is formed using the rectangular frame 2. The pins 13 are removably provided with a predetermined pitch between one another on the frame 2 so as to surround an area 48 where the connection yarns z are inserted. As shown in FIG. 8, an x fiber layer is arranged by folding back a fiber x as it engages each pin 13 along an x axial direction. A y fiber layer, and bias fiber layers are formed in the same manner by folding back a fiber y or bias fibers B1, B2 at each pin 13 along each predetermined direction. As shown in FIG. 8(a), the fiber x is folded extending parallel to the longitudinal direction of the frame 2. As shown in FIG. 8(b), the fiber y is arranged to extend in the width direction of the frame 2. As shown in FIGS. 8(c) and (d), the bias fibers B1, B2 are arranged to extend at an angle of 45 degrees with respect to the longitudinal direction of the frame 2. Each fiber is selected from various materials such as carbon fibers, glass fibers, polyamide fibers, etc., selected according to the purpose of the composite made from the three-dimensional fabric.

A predetermined number of the fiber layers are laminated on the frame 2 in a predetermined order to form the lamination 3. A press plate presses the fiber layers from above when the arrangement of a single fiber layer is completed or when the arrangement of an adequate number of fiber layers is completed.

Figure 9:
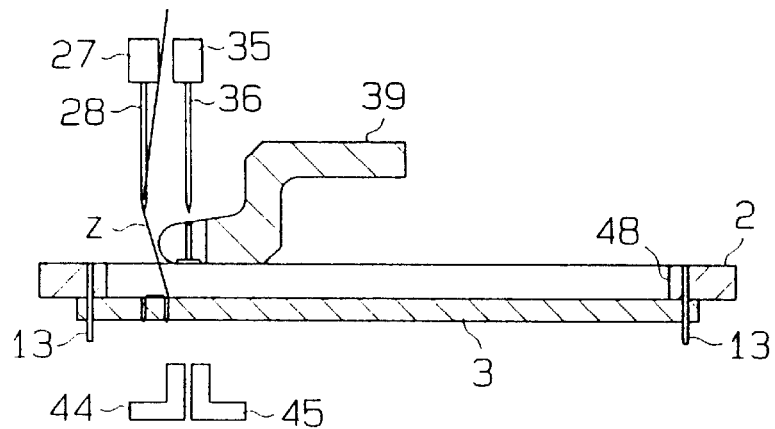
FIGS. 9 to 14 are diagrammatic cross-sectional views showing the procedures for inserting a connection yarn into the laminated fiber layers.

The frame 2 is then fixed to the support brackets 12 on the table 6 together with the lamination 3 by bolts. In this state, the piston rod 17a of the air cylinder 17 is retracted. As shown in FIG. 9, the left end of the yarn inserting area 48 is located at its original position where the left end is aligned with the perforating needles 36. FIG. 2 shows the table 6 in a position where insertion of the yarns z are nearly completed.

When the table 6 is arranged at its original position with the inserting needles 28, the perforating needles 36, the press plate 39, and the press blocks 44, 45 at the standby position, insertion of the yarns z into the lamination 3 is started.

Figure 10:
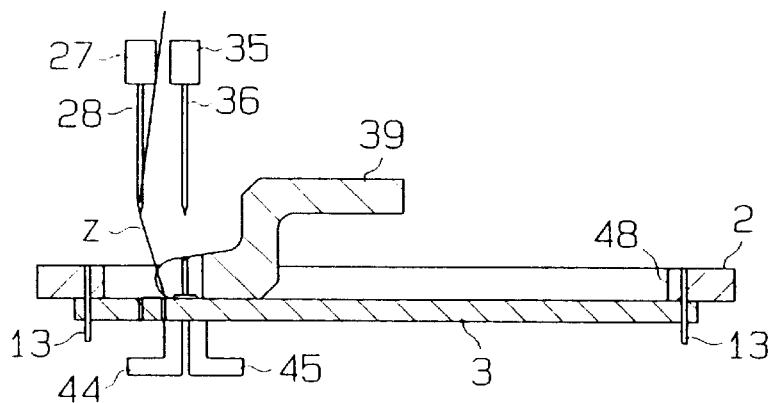
Figure 11:
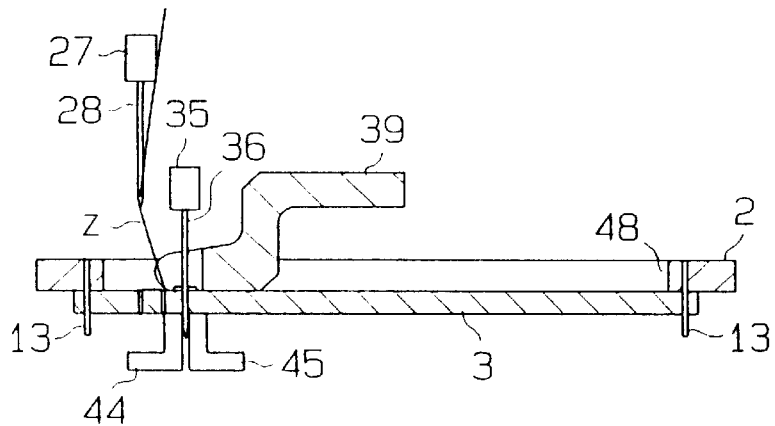

From the initial state shown in FIG. 9, the air cylinders 37, 41, 42 move the press plate 39 and the press blocks 44, 45 to their operational position as shown in FIG. 10. The press plate 39 and the press blocks 44, 45 keep the portion corresponding to the perforating needles 36 in a compressed state. When the air cylinder 33 is actuated in this state, the perforating needles 36 are advanced to the operational position and penetrate the lamination 3 as shown in FIG. 11. Since each perforating needle 36 is guided by the recesses 40a, the needle 36 penetrates the lamination 3 perpendicularly even if the needle 36 is slightly bent. Since the protruded end of each perforating needle 36 is pressed into the space defined between the press blocks 44, 45 to be clamped therebetween, the arrangement of each fiber of the lamination 3 remains aligned during the advancement of the perforating needles 36.

The air cylinder 33 is then actuated to move back the perforating needles 36. The fibers constituting the lamination 3 compressed by the press plate 39 and the press blocks 44, 45 densify the lamination 3. This ensures the formation of holes 3a (FIG. 12), at the positions where the perforating needles 36 penetrate the lamination 3 when the needles 36 are moved back.

Figure 12:
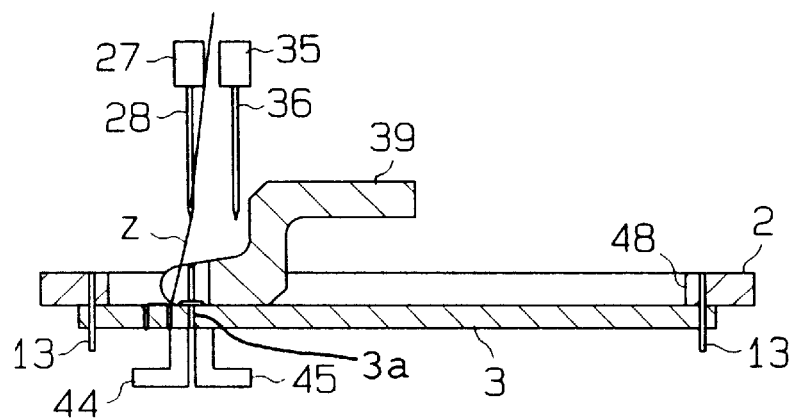
Figure 13:
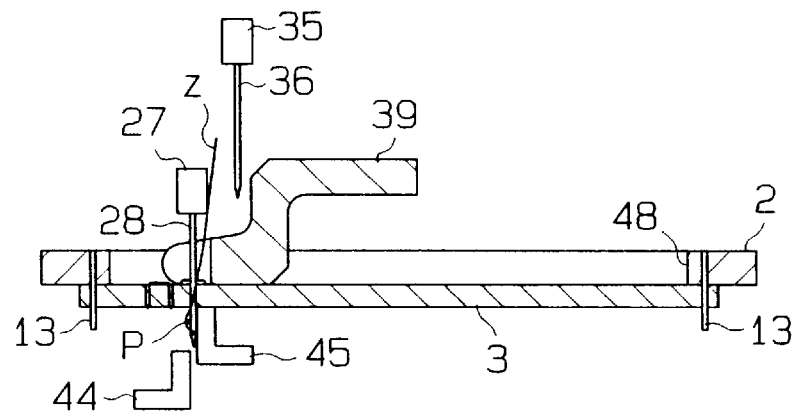
Figure 15A:
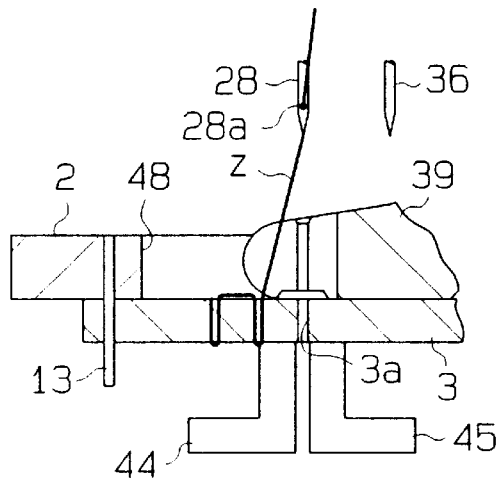
FIG. 15(a) is a partial enlarged view of FIG. 12
Figure 15B:
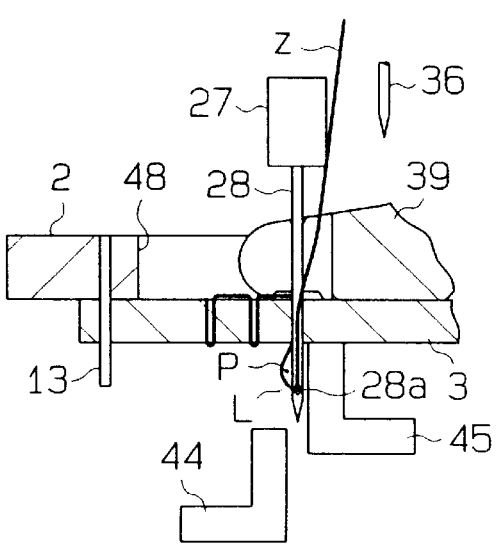
FIG. 15(b) is a partial enlarged view of FIG. 13.

The piston rod 17a of the air cylinder 17 is then extended. This moves the rows of the perforating needles 36 and the inserting needles 28 to a position where the inserting needles 28 correspond to the holes 3a as shown in FIGS. 12 and 15(a). The air cylinder 41 is then actuated to move the press block 44 to a standby position. Afterward, the motor 25 rotates the lead screw 20 in the forward direction. This advances the inserting needles 28 to an operational position. The inserting needles 28 are inserted into the lamination holes 3a in the 3 until their needle holes 28a are exposed at the front side of the lamination 3. After the inserting needles 28 reach the frontmost position, the motor 25 is rotated in the reverse direction to slightly move back the inserting needles 28. As a result, a loop L, which tolerates the passage of the needle 47 therethrough, is formed in each yarn z as seen in FIG. 15(b), which runs from the lamination 3 to the associated needle hole 28a.

When the inserting needles 28 are inserted into the lamination 3, the press block 44 is moved to the standby position. This decreases the pressing force against the lamination 3. However, since the inserting needles 28 are inserted into the holes 3a formed by the perforating needles 36, the resistance against the inserting needles 28 during insertion is small. This allows the fibers of the lamination 3 to remain aligned.

The needle 47 shown in FIG. 1 is then moved without holding a lock yarn P. That is, the needle 47 passes through a previously inserted loop (not shown) of the yarn P, which prevents the yarns z from falling out, and advances along the direction of the row of inserting needles 28. The distal end of the needle 47 passes through the loops L of each yarn z, held by the associated inserting needle 28, one at a time and stops when it reaches the rim of the lamination 3. The yarn P, extending continuously from a yarn feeding source (not shown), is then hooked to the distal end of the needle 47. The latch of the needle 47 is then closed and the needle 47 is moved back through each loop L of the yarns z. The closed latch of the needle 47 prevents the needle 47 from hooking the loops L therein. The loop of the yarn P hooked to the needle 47, shown in FIG. 1, is then inserted into the previously formed loop of the yarn P.

Afterward, the motor 25 is rotated in the reverse direction and the inserting needles 28 are separated from the lamination 3 and retreat to the standby position. The air cylinder 41 then moves the press block 44 to the operational position once more. In this state, a tension adjusting mechanism (not shown) pulls back the connection yarns z inserted into the lamination 3 and tightens them with the lock yarn P preventing the yarns z from falling out as shown in FIG. 14.

When the yarns z are pulled back, the yarns z are not clamped between the surface of the comb section 39b, which abuts against the lamination 3, and the lamination 3. Thus, excessive force is not applied to the yarn z. This is due to the recess 39c on the abutting surface of the comb section 39b defined at a location that corresponds to the recess 40a of each tooth 40.

Figure 14:
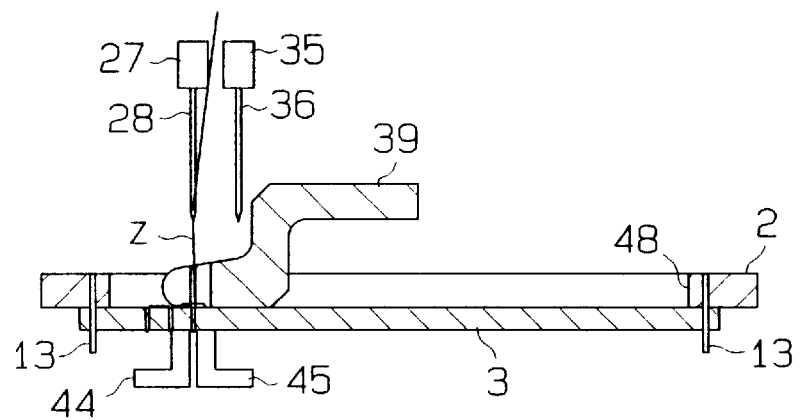

The air cylinder 17 then returns the support plate 16 together with the perforating needles 36 and the inserting needles 28 in a leftward direction from the position shown in FIG. 14 to the initial position shown in FIG. 9. The air cylinders 37, 41, 42 are actuated to shift the press plate 39 and the press blocks 44, 45 to the standby position. This completes a single inserting cycle of the connection yarns z.

The motor 9 then moves the table 6 for a distance equal to the inserting pitch of the yarn z. The perforating needles 36 are arranged opposing the lamination 3 at the next connection yarn inserting position. In this state, the loop of the needle 47 is bent substantially along the lower rim of the lamination 3. The steps of the yarn z inserting cycle are then executed, consecutively. As a result, each fiber layer constituting the lamination 3 is bound by the yarn z thus producing the three-dimensional fabric. After insertion of the yarns z into the lamination 3 is completed, the pins 13 are removed from the frame 2 and the three-dimensional fabric is detached from the frame 2. This completes the production of the three-dimensional fabric.

The press plate 39 interferes with the frame 2 when the plate 39 is moved to the operational position at the vicinity of the right end of the frame 2. Thus, at this location, the yarns z are inserted without the pressing of the press plate 39. However, at this point, insertion of each yarn z is completed at most portions of the yarn inserting area 48 of the lamination 3. Thus, most portions of the lamination 3 have already been tightened by the yarns z. Furthermore, since the inserting position of each yarn z is located near the frame 2, the lamination 3 is maintained in a compressed state between the press block 45 and the frame 2. This allows smooth insertion and tightening of each yarn z even at the vicinity of the right end of the frame 2 regardless of the the fact that the lamination 3 is not pressed by the press plate 39.

As described above, the lamination 3 is formed on the frame 2 provided with the pins 13 in a manner surrounding the area 48 which corresponds to the yarn z inserting area. This allows a great reduction in the efforts necessary to erect the pins 13.

In this embodiment, unlike the method where pins are erected throughout the entire inserting area of the yarns z, the fiber is not bent at midway positions between folding pins when engaging with other pins and the aligning pitch of each row does not vary. As a result, the straightness of the produced three-dimensional fabric is improved. This leads to enhanced characteristics of a composite made from the fabric.

In the prior art method that exchanges the pins erected throughout the entire inserting area of the vertical fiber with the connecting fiber, the operation in which the lamination is compressed to enhance the Vf value is conducted with the pins remaining within the lamination. Thus, the fabric is not sufficiently compressed and the Vf value is not enhanced satisfactorily. Contrarily, in the present invention, compression of the lamination 3 is carried out without pins existing in the compressed portion. In addition, sectional compression is performed on the portion corresponding to the inserting portion of a single row of yarns z. Accordingly, this enables the press plate 39 and the press blocks 44, 45 to be moved with a small motive power and to efficiently compress the lamination 3 at the vicinity of where the inserting needles 28 insert the yarns z.

Furthermore, when this prior art lamination is compressed with the pins inserted therein, the fibers become deformed along the outer diameter of the pins. This deformation is not restored when the pins are removed. Thus, holes remain at the positions where the pins, which have a diameter larger than the connection yarn, were erected. This results in a degradation in the material of the composite made from the produced three-dimensional fabric when a resin is impregnated on the fabric to form a composite due to the holes becoming rich with the resin. However, this does not occur in the present invention.

Additionally, the lamination 3 formed on the frame 2 is supported thereto by pins 13 until the insertion of the yarns z are completed. This maintains the fibers that constitute the lamination 3 in a tense state until the production of the three-dimensional fabric is completed. Thus straightness of the fibers constituting the three-dimensional fabric is improved and the characteristics of the composite made therefrom is enhanced when compared to a method in which the lamination is removed from a base plate together with the pins after being formed.

Figure 16:
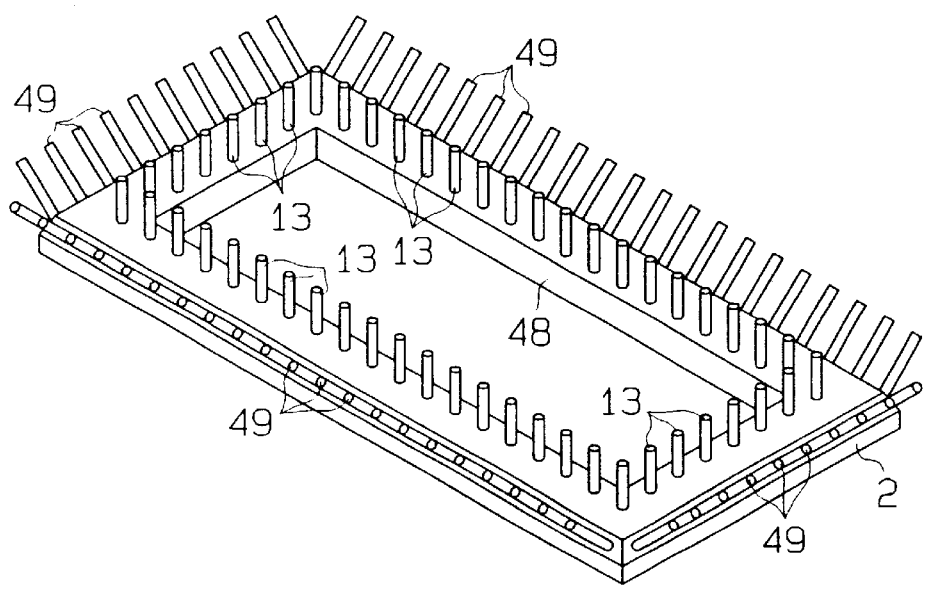
FIG. 16 is a schematic perspective view showing a frame according to a second embodiment of the present invention.

A second embodiment will now be described with reference to FIGS. 16 and 17. The structure of the apparatus in this embodiment is the same as the first embodiment except for the frame 2 that forms the lamination 3. As shown in FIG. 16, inner pins 13 are aligned in a row on the frame 2 at the periphery of the area 48. Outer pins 49 are provided with a predetermined pitch between one another at the outer side of the pins 13. The outer pins 49 are inclined outward from the frame 2 and removably fixed to the frame 2.

The fibers constituting the lamination 3 are fed from a guide pipe. The guide pipe makes it extremely difficult to arrange each fiber by engaging each fiber consecutively with each pin 13 and folding it in a manner such that the fiber is kept in contact with the previously arranged fiber layer. In other words, due to the possibility that the pipe that feeds the fiber may damage the previously arranged fiber layer, the fiber is engaged with and folded back at the pins 13 from above this fiber layer. Therefore, it is necessary to move the fiber layers in a direction toward the frame 2 after every fiber layer or every predetermined number of fiber layers are arranged.

In the present embodiment, the fiber is successively arranged by engaging the fiber consecutively with each pin 49, provided at the outer side of the inner pins 13, and folding back the fiber. For example, as shown in the double-dotted lines of FIG. 17, the fiber x is automatically moved toward the frame 2 along the inclination of the pins 49 when tension is applied to the fiber x as it is arranged engaged to and folded back at the pins 49. After the arrangement of the x fiber layer is completed, the fiber x is maintained pressed toward the frame 2. In the same manner, the fibers that form the other layers are also automatically moved toward the frame 2 when engaged to and folded back at the upper portion of the pins 49. Accordingly, the arranging operation of the fiber layers does not have to be interrupted to move the arranged fiber layer toward the frame 2 even when there is a large number of fiber layers. This allows continuous arranging of the fibers until the formation of the predetermined number of fiber layers are completed.

In this embodiment, the fiber is arranged with tension applied to the fiber to enhance the characteristics of the composite made from the produced three-dimensional fabric. If the tension is too strong, a force directed toward the inner side of the frame 2 acts on the outer pins 49 and bends the pins 49 inward. However, the arranging position of the fibers is accurately restricted by the inner pins 13. In addition, the outer pins 49 are inclined outward from the beginning. Thus, a small bending of the pins 49 will not effect the arranging of the fibers. By erecting the inner pins 13 inclined outward, the fibers will automatically be moved toward the frame 2. However, as the number of the fiber layers becomes large and the lamination 3 become thick, it becomes difficult to form a three-dimensional fabric having a rectangular cross-section.

Although only two embodiments of the present invention have been described herein, it should be apparent to those skilled in the art that the present invention may be embodied in many other specific forms without departing from the spirit or scope of the invention. Particularly, it should be understood that the present invention may be modified to the forms described below.

Figure 18:
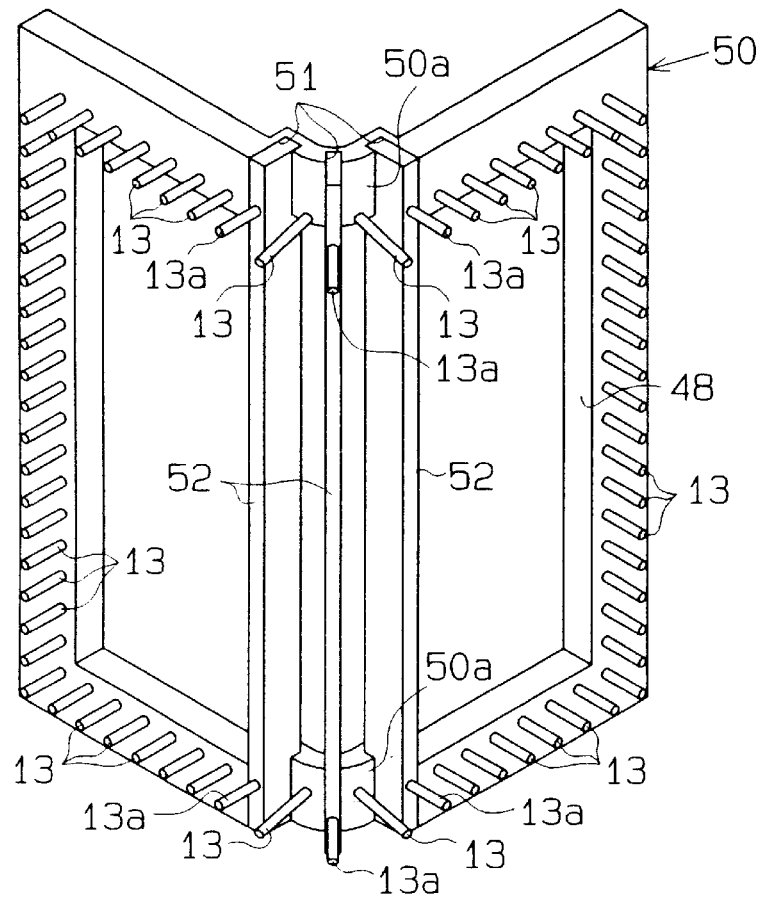
FIG. 18 is a schematic perspective view of a frame according to another embodiment of the present invention.

(1) The present invention may be applied to three-dimensional fabrics which are not plate shaped, e.g., three-dimensional fabrics which are angular shaped, prism shaped, cylindrical, or shaped by cutting out a side from a cylinder having a bottom floor. A frame 50, shown in FIG. 18, is used to produce the angular three-dimensional fabric. The frame 50 has stepped portions 50a at its corner section. Grooves 51 are provided extending in the width direction of the frame 50. Support bars 52 are removably fitted into the grooves 51. Pins 13a are removably erected on the support bars 52. Pins 13 are removably provided on the stepped portions 50a at positions between the grooves 51.

Fibers are arranged to form a lamination 3 such as the type disclosed in the Japanese Unexamined Patent Publication 4-289241 by employing the frame 50. After the lamination 3 is formed, the frame 50 is fixed to support brackets on the table 6 for insertion of the connection yarn z. The shape and arrangement of the support brackets are determined by the shape of the frame 50. The support brackets are rotatably mounted on the table 6 about an axis which extends through the curvature center of the corner section of the frame 50. The insertion of the yarns z at the two flat sections of the frame 50 are carried out in the same manner as the above embodiment. The insertion of the yarn z at the corner section of the angular lamination is performed using a single needle in the manner described below.

The pins 13a of one of the support bars 52 are removed and held in the lamination 3. In this state, the support bar 52 is moved in a predetermined direction to separate the bar 52 from the inserting path of the needle. The needle then penetrates the lamination 3 and inserts the yarn z. The insertion of the yarn z and the moving of the support bar 52 are alternately repeated until the insertion of the yarn z at the location corresponding to a single bar 52 is completed. In this manner, the same task is performed at the locations where the remaining bars 52 are mounted to complete the insertion of the yarn z at the corner section of the angular lamination 3.

The connection yarn z is inserted into the lamination 3 from the projecting side of the pins 13. It is preferable for the distal end section of the press blocks 44, 45 to be removable so that it may be exchanged with an abutting member corresponding to the shape of the corner section of the lamination 3.

(2) in the above mode (1), support plates may gradually be inserted into the groove 51, when moving the support bar 52 for insertion of the yarn z, to secure the pins 13a in holes provided in the plates. This will allow the fibers to be maintained in an arranged state without returning each support bar 52 to its associated groove 51 during insertion of the yarns z into the corner sections.

Figure 19A:
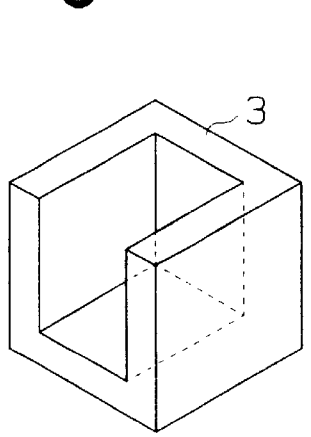
FIG. 19(a) is a schematic perspective view of laminated fiber layers in another embodiment and FIG. 19(b) is a diagrammatic cross-sectional view showing the insertion of a lock yarn.
Figure 19B:
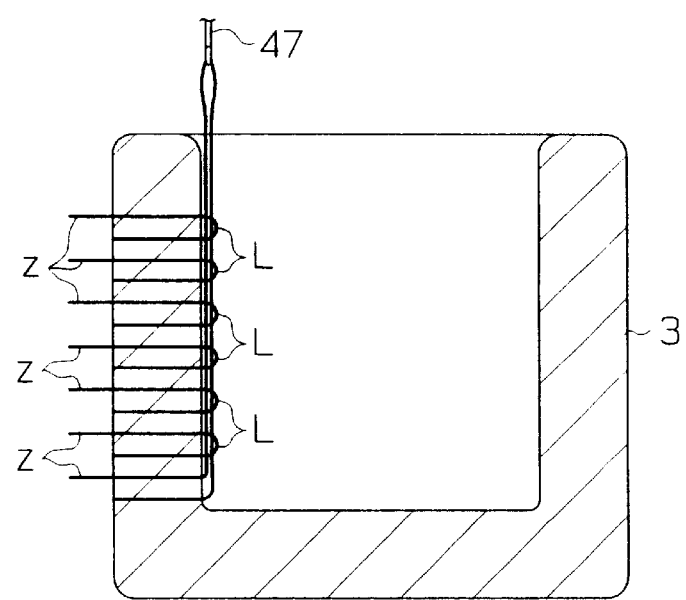
Figure 20:
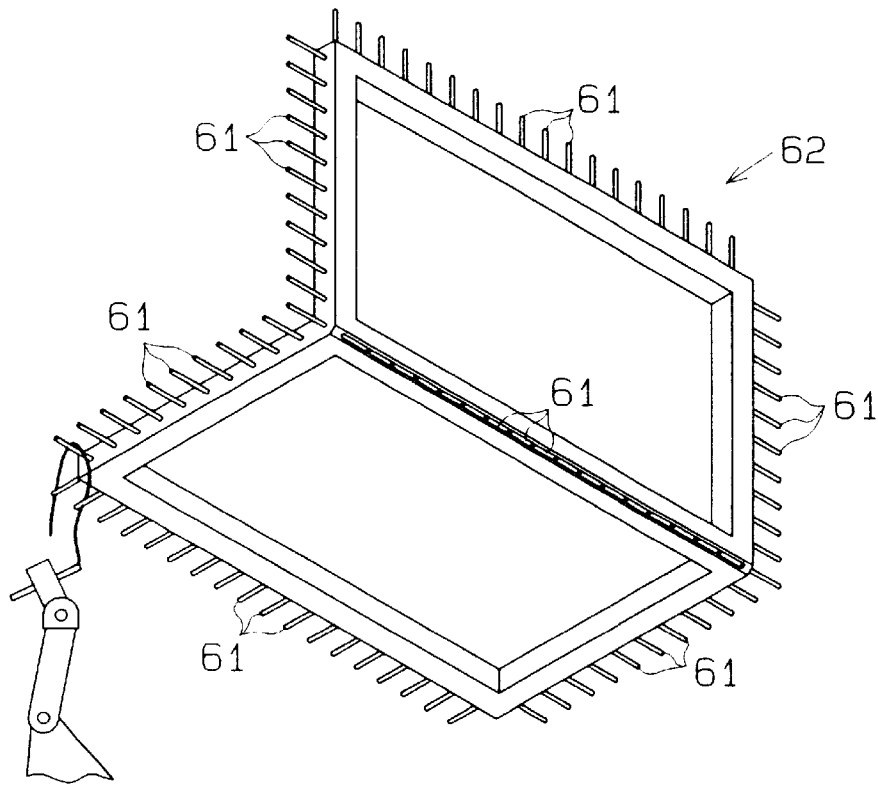
FIG. 20 is a schematic perspective view of a prior art frame.
Figure 20:
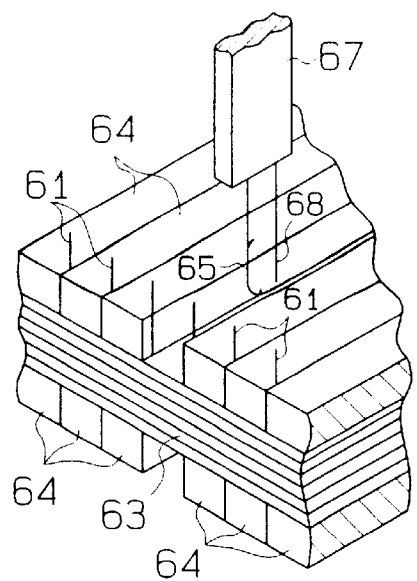
Figure 20:
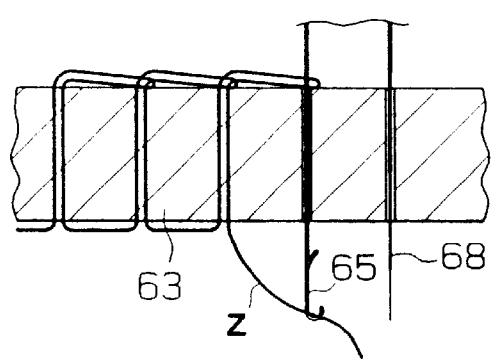

(3) As shown in FIG. 19(a), when the lamination 3 is formed having a hollow box shape in which a portion of the side walls are cut out, it is difficult to insert the yarn P into the lamination 3 folding it successively as in the manner of the first embodiment. In this case, one of the yarns z is hooked to a needle 47 as shown in FIG. 19(b). This yarn z is then inserted through the loops L of the other yarns z to prevent the yarns z from falling out. With this structure, a three-dimensional fabric is produced utilizing an apparatus similar to the apparatus of the first embodiment.

Figure 17:
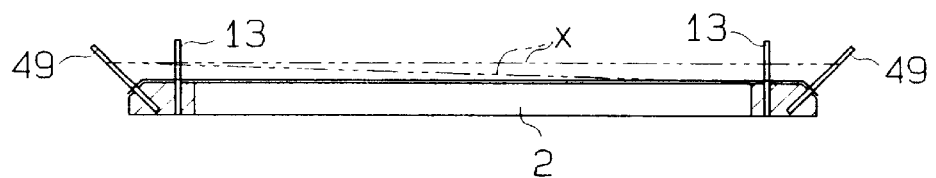
FIG. 17 is a diagrammatic cross-sectional view showing a fiber when it is arranged.

(4) The inner pins 13 of the second embodiment shown in FIG. 17 do not necessarily have to be removable. Removal of the outer pins 49 will enable disengagement of the three-dimensional fabric from the pins 13 regardless of whether the pins 13 are fixed on the frame 2.

(5) By enabling adjustment of the pressing force of the press plate 39, the pressing force of the press plate may be weakened during insertion of the needles 36, 28 and strengthened when the yarns z are pulled back. Furthermore, the press plate 39 may be shifted to the standby position with only the press blocks 44, 45 shifted to the operational position during insertion of the needles 36, 28. In this case, the needles 36, 28 are inserted into the lamination 3 when the fibers are not compressed. This reduces the inserting resistance of the needles 36, 28 and allows smooth insertion.

(6) Depending on the thickness of the lamination 3 or type of fiber used, the inserting needles 28 may be directly inserted into the lamination 3 without opening holes with the perforating needles 36.

(7) The press blocks 44, 45 arranged at the protruding side of the inserting needles 28 with respect to the lamination 3 do not necessarily have to be two blocks utilized as a set. Utilization of only a single block is possible. In this case, when the single press block is at the operational position while the inserting needles 28 are inserted into the lamination 3, the press block is located at a position where it does not interfere with the formation of the loop L of each yarn z.

(8) The recess 39c on the comb section 39b of the press plate 39 may be omitted making the surface that abuts against the lamination 3 flat. Furthermore, the teeth 40 may be formed to define a space between one another which is slightly larger than the diameter of the inserting needles 28 and the perforating needles 36. This will allow the recesses 40a to be omitted. The press plate 39 may be formed without the comb section 39b and having a pressing section that extends straight along the row of the needles 28 instead.

(9) The inserting needles 28 may be moved along a vertical direction instead of a horizontal direction. In this case, the arrangement of each components shall be altered accordingly.

(10) The yarn P may be prevented from falling out by merely tightening the yarns z instead of inserting the loop of the yarn P into the previously formed loop of the yarn P.

(11) The lamination 3 need only be arranged along at least only the two axial directions of the x and y axis. Thus, the bias fibers B1, B2 may be omitted. In another example, the lamination 3 may be arranged along three axial directions. In this case, the pair of bias fibers B1, B2 is arranged inclined at an angle of ±60 degrees with respect to the fiber y while the fiber x is omitted. In another example, the bias fibers B1, B2 may be inclined at angles other than 45 degrees in the lamination 3 described in the above embodiments.

Therefore, the present examples and embodiments are to be considered as illustrative and not restrictive and the invention is not to be limited to the details given herein, but may be modified within the scope of the appended claims.

What is claimed is:

1. An apparatus for producing a three-dimensional fabric including laminated fiber layers having at least first and second fiber layers, said first fiber layer comprising fibers arranged in a first axial direction and said second fiber layer comprising fibers arranged in a second axial direction, connection yarns inserted into the fiber layers along a direction perpendicular to the fiber layers to connect the fiber layers with each other, said apparatus comprising:

a holding device having a frame including a plurality of restriction members located with a predetermined pitch on the frame so as to surround an area where said connection yarns are inserted into said fiber layers, said holding device holding said frame together with said fiber layers located on said frame;

a movable support table supporting said frame and being movable by a predetermined pitch along a direction parallel to the plane of the fiber layers;

first driving means for driving said support table;

a needle support equipped with a plurality of yarn inserting needles arranged in a series by a predetermined pitch and each yarn inserting needle having a needle hole through which one of said connection yarn is inserted, said needle support being movable along a direction perpendicular to the fiber layers;

second driving means for moving said needle support between a standby position where said yarn inserting needles are apart from the fiber layers and an operational position where each yarn inserting needle penetrates said fiber layers so that each needle hole is exposed from the fiber layers to form a loop of each said connection yarn;

a first pressing member located at the standby position side of said yarn inserting needles with respect to the fiber layers, said first pressing member being movable along the direction that said yarn inserting needles move;

a first driving device for moving said first pressing member between an operational position where said first pressing member presses the fiber layers and a standby position where the first pressing member is apart from said fiber layers;

a second pressing member located opposite to the first pressing member with respect to said fiber layers and movable along said direction that said yarn inserting needles move along;

a second driving device for moving said second pressing member between an operational position where said second pressing member presses the fiber layers and a standby position where said second pressing member is apart from said fiber layers; and a needle for holding a lock yarn to be inserted into each said loop of said connection yarns, said needle being movable between an operational position where said needle penetrates each said loop of said connection yarns linking each yarn inserting needle at the operational position and a standby position where said needle is apart from said fiber layers.

2. The apparatus according to claim 1 further comprising a perforating needle support arranged in parallel to said needle support and having a plurality of perforating needles arranged by a predetermined pitch and in a series, and third driving means for moving said perforating needle support between a standby position where said perforating needles are apart from said fiber layers on said frame and an operational position where said perforating needles penetrate said fiber layers.

3. The apparatus according to claim 1, wherein said first pressing member includes a support section extending along a direction where said yarn inserting needles are arranged and a comb section formed integrally with said support section and being capable of pressing against said fiber layers while clamping said yarn inserting needles.

4. The apparatus according to claim 2, wherein said first pressing member includes a support section extending along a direction where said yarn inserting needles are arranged and a comb section formed integrally with said support section and being capable of pressing against said fiber layers while clamping said yarn inserting needles.

5. The apparatus according to claim 1, wherein said plurality of restriction members include a plurality of pins vertically standing in a predetermined pitch from and along an outer periphery of said frame.

6. The apparatus according to claim 5, wherein said plurality of restriction members further include a plurality of outer pins arranged outside of said pins in a predetermined pitch along the outer periphery of said frame, said outer pins inclining outward.

7. The apparatus according to claim 2 further comprising a driving mechanism for reciprocating said second driving means and said third driving means with respect to said pitches of said yarn inserting needles and said perforating needles.

* * * * *

UNITED STATES PATENT AND TRADEMARK OFFICE
CERTIFICATE OF CORRECTION

PATENT NO. : 5,833,802
DATED : November 10, 1998
INVENTOR(S) : Yasui, Hori, Amano, Takeuchi It is certified that error appears in the above-identified patent and that said Letters Patent is hereby corrected as shown below:

In column 9, line 47, delete ", and the lamination" 3.

Claim 1, column 13, line 54: after the word "direction," and before the word "connection", insert --and--.

Claim 1, column 14, line 4: change "yarn" to --yarns--.

Signed and Sealed this

Eighth Day of June, 1999

*Attest:*

*Attesting Officer*

Q. TODD DICKINSON

*Acting Commissioner of Patents and Trademarks*